United States Patent
Puichault et al.

(10) Patent No.: US 12,382,858 B2
(45) Date of Patent: Aug. 12, 2025

(54) SOWING AND SEEDING UNIT

(71) Applicant: Ribouleau Monosem, Largeasse (FR)

(72) Inventors: Alexis Puichault, Cerizay (FR); Thomas Renoux, Vix (FR); Sébastien Bodin, Surin (FR); Fabrice Boutrand, Thouars (FR)

(73) Assignee: RIBOULEAU MONOSEM, Largeasse (FR)

( * ) Notice: Subject to any disclaimer, the term of this patent is extended or adjusted under 35 U.S.C. 154(b) by 1029 days.

(21) Appl. No.: 17/145,175

(22) Filed: Jan. 8, 2021

(65) Prior Publication Data

US 2021/0321559 A1 Oct. 21, 2021

(30) Foreign Application Priority Data

Apr. 15, 2020 (EP) .................................. 20169512

(51) Int. Cl.
  *A01C 15/00* (2006.01)
  *A01C 7/08* (2006.01)

(52) U.S. Cl.
  CPC .............. *A01C 15/006* (2013.01); *A01C 7/08* (2013.01)

(58) Field of Classification Search
  CPC ............................................ A01C 7/06–208
  USPC ................................................ 111/170–186
  See application file for complete search history.

(56) References Cited

U.S. PATENT DOCUMENTS

| | | | |
|---|---|---|---|
| 4,259,912 A * | 4/1981 | Stocks et al. ............ | A01C 7/08 111/178 |
| 4,485,939 A | 12/1984 | Gafford et al. | |
| 4,541,549 A | 9/1985 | Hadley et al. | |
| 6,899,042 B1 * | 5/2005 | Kowalchuk ............ | A01C 7/046 111/900 |
| 9,907,224 B2 | 3/2018 | Rosengren et al. | |
| 2009/0013909 A1 * | 1/2009 | Wendte ................. | A01C 7/046 111/185 |

(Continued)

FOREIGN PATENT DOCUMENTS

| | | |
|---|---|---|
| DE | 3439476 A1 | 4/1986 |
| EP | 2060163 A1 | 5/2009 |
| FR | 1595598 A | 6/1970 |

(Continued)

OTHER PUBLICATIONS

Image of Kverneland Optima row unit, SIMA 2019, 1 page.

(Continued)

*Primary Examiner* — Tara Mayo (57) ABSTRACT

A system for distributing granular products into the soil includes a mechanism for opening a furrow in the soil, a mechanism for filling the furrow, and an assembly for distributing a granular product. The assembly for distributing granular product includes a main hopper, a first distribution mechanism for distributing a first granular product, and a first conveyor mechanism for carrying the granular product to the soil. The assembly for distributing granular product also includes a dispensing assembly for an additional or second granular product. The dispending assembly is configured to deposit the additional granular product to the soil at the location where the first granular product was deposited and at least one of before furrow opening mechanism and after the furrow closing mechanism.

28 Claims, 3 Drawing Sheets

(56) References Cited

U.S. PATENT DOCUMENTS

2015/0237794 A1* 8/2015 Sauder et al. ......... A01C 7/102
　　　　　　　　　　　　　　　　　　　　　　111/185
2016/0095274 A1* 4/2016 Wendte et al. ...... A01B 79/005
　　　　　　　　　　　　　　　　　　　　　　111/200

FOREIGN PATENT DOCUMENTS

FR　　　　2053831 A5　4/1971
WO　　WO 98/42177 A1　10/1998
WO　WO 2018/184896 A1　10/2018

OTHER PUBLICATIONS

Extended European Search Report and Written Opinion issued in European Patent Application No. 20169512.9, dated Sep. 30, 2020, in 4 pages.

* cited by examiner

SOWING AND SEEDING UNIT

INCORPORATION BY REFERENCE TO ANY PRIORITY APPLICATIONS

This application claims priority benefit of EP Application No. 20169512.9 (Dkt. No. P29560-EP-PRI2), filed on Apr. 15, 2020. All of the above applications are incorporated by reference herein and are to be considered a part of this specification. Any and all applications for which foreign or domestic priority claim is identified in the Application Data Sheet as filed with the present application are hereby incorporated.

BACKGROUND

Field

The present application relates generally to a sowing unit for distributing several granular products at the same time and a sowing machine equipped with this type of sowing unit.

Description of the Related Art

In agriculture, it is common practice to treat the soil or crops with certain treatment products, such as fertilizers, herbicides or insecticides. This is often performed using spraying equipment, for liquid products, or using granular distribution equipment for grain or pellet type products.

For granular agrochemical products, they are usually applied at the same time as sowing seeds, and in close proximity to these seeds. This optimizes the effectiveness of the product on the seed or plant in the early stages of germination or sprouting. This is usually done with the help of specific equipment, including specially designed hoppers and a separate distribution system for each hopper.

For example, document FR 1 595 598 describes a seed drill with a first hopper containing fertilizer and a second hopper containing seeds. The fertilizer delivery tube is located between two seed delivery tubes that deposit the seeds in separate seed furrows, which are then covered by burying rollers. The fertilizer furrow is separate from and parallel to the seed furrows. This fertilizer furrow is covered by a separate burying roller.

Document DE 3 439 476 describes a seed drill that distributes granular products at different heights in a furrow, which is formed by a granular distribution coulter. The granular products are distributed in the soil through separate channels in the coulter housing. The seed drill deposits the first granular product and then partially closes the furrow before depositing the second product. It also includes a furrow filling and compacting wheel, so that the soil in the center of the partially covered furrow is pressed down more than the soil in the outer region of the furrow, before the furrow is completely filled in. The seed drill's distributor coulter includes a granular product routing guide which ensures that the second granular product is deposited in the furrow at either the same depth as the first granular product or at a shallower depth in the furrow.

SUMMARY

In some embodiments, a sowing unit for distributing granular products into the soil includes a chassis, a means of opening a furrow in the soil, means of refilling the furrow, a first granular product distribution assembly, including a main hopper, a first distribution system for distributing the first granular product, and a second distribution system for distributing a second granular product, in communication with the main hopper, a means of transporting the first granular product to the soil, at a first relative distribution position (P1) located between the furrow opening and filling elements, at least one additional second distribution assembly for at least one additional granular product, a distribution mechanism capable of depositing the at least one additional granular product at the relative distribution position (P1), and at another relative distribution position (P2) located before the furrow opening mechanism, or at another relative distribution position (P3) located after the furrow filling mechanism, the additional distribution assembly, cooperating with or including a selection mechanism for depositing the additional granular product or products at one of the relative distribution positions (P1), (P2) or (P3), and at both the relative distribution positions (P1) and (P2), (P1) and (P3), or (P2) and (P3).

The sowing device may include at least one, or any suitable combination thereof, of the following features. The sowing unit may also include means for compacting the granular products deposited at the bottom of the open furrow, which are disposed behind the furrow opening mechanism and in front of the furrow filling mechanism, and in which the relative distribution position (P1) is behind the furrow opening mechanism and in front of the compacting elements, with the additional distribution assembly being capable of depositing the additional granular product in an additional relative distribution position (P4) located after the compacting elements and before the furrow filling mechanism. The additional distribution assembly may include, a second assembly for distributing a second granular product, comprising a first additional hopper, second distribution elements for distributing the second granular product into the soil, in communication with the first additional hopper, with the second distribution assembly being capable of depositing the second granular product in the relative distribution positions (P1) and (P2), and/or a third distribution assembly for distributing a third granular product, including a second additional hopper (28) and a third distribution assembly for distributing a third granular product into the soil, which are in communication with the second additional hopper, with the third distribution assembly being capable of distributing the third granular product in relative distribution positions (P1), (P3) and (P4). The second and third distribution assemblies may work in conjunction with or respectively include a conveyor mechanism with a number of distribution channels, each corresponding to a relative distribution position (P1) to (P3) or to (P4) and connected at a distribution node. The conveyor mechanism may include a multi-way selector valve located at the distribution node. The first additional hopper may be integrated into or within the main hopper. The first additional hopper may be an independent box that is fixed to the main hopper in such a way that it can be removed from the main hopper. The first additional hopper may be a separate compartment in the main hopper, the hoppers sharing one or several common panels and being separated by at least one dividing panel than can be removed or repositioned. The removable panel can be moved using one or several rails fitted on the inner surface of one or two of the main hopper panels. The first and second distribution systems may be arranged in line with the furrow opening mechanism. The first distribution assembly can be used to distribute seeds and the additional distribution assembly can be used to distribute granular agrochemicals or granular fertilizers.

This disclosure also relates to a seed drill with one or several sowing units.

DETAILED DESCRIPTION

In the following description and claims, the terms "top," "bottom," "above," "below," "upper," "lower," "vertical" and "horizontal," "front" and "back," "in front" and "behind" are used; these refer to the normal position of the sowing unit 1, and its component parts during normal use, and in particular they refer to its position(s) as shown in FIGS. 1 to 6, and to the direction of movement (D) of the sowing unit (1).

Figure 1:
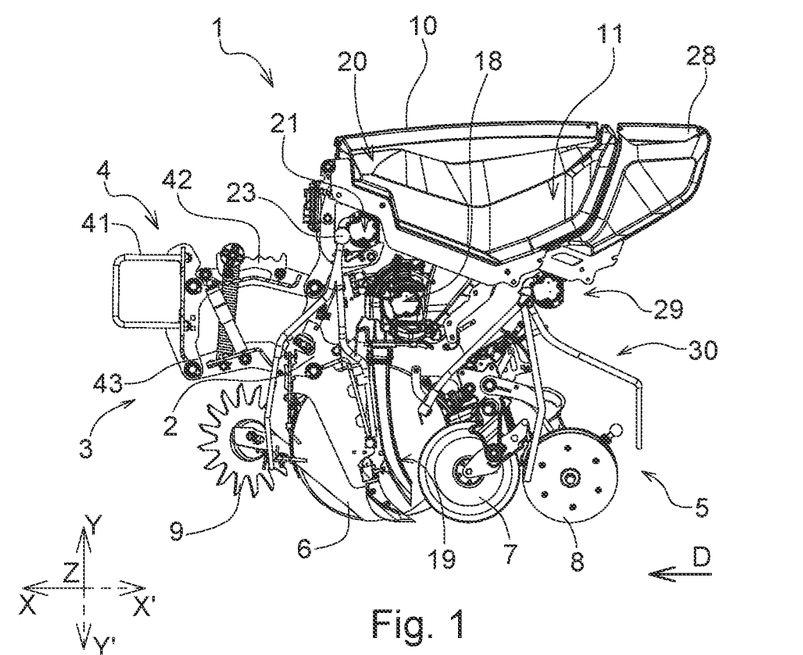
FIG. 1 is a diagram showing the side view of a sowing unit.
Figure 2:
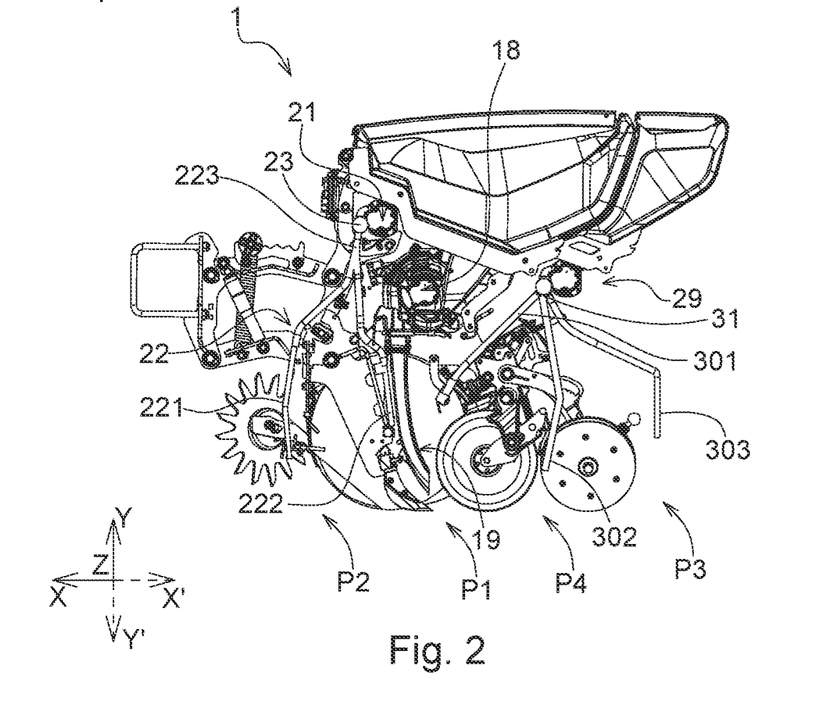
FIG. 2 is the same as FIG. 1.
Figure 3:
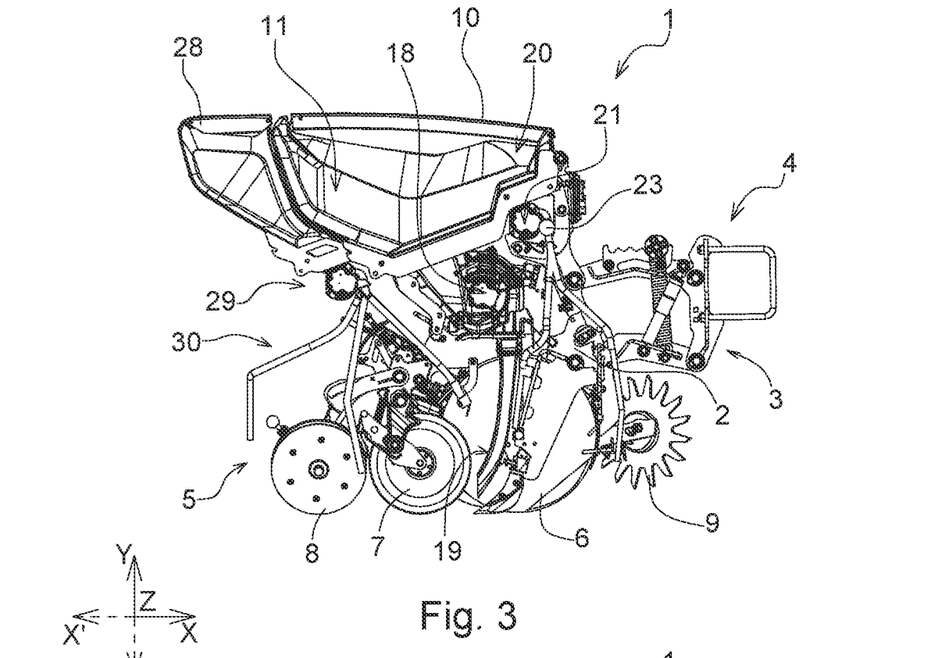
FIG. 3 is a diagram of how the sowing unit in FIGS. 1 and 2 is constructed, but viewed from the other side.
Figure 4:
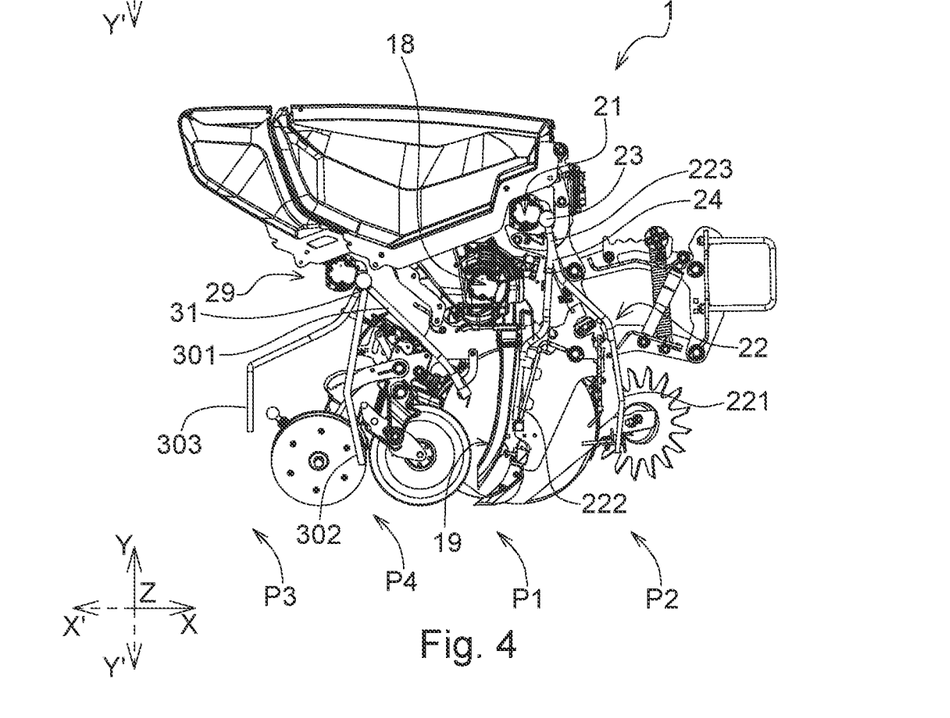
FIG. 4 is the same as FIG. 3.

The sowing unit (1) is mounted on a chassis (2), which is either automatically driven, or carried or towed by an agricultural machine, i.e. a tractor. The chassis (2) includes a front part (3), which is defined according to the direction of travel (D) of the sowing unit (1) during normal use, as shown in FIG. 1. For a towed sowing unit (1), this includes part 3, which is located close to the rear of the agricultural machine, and carries hitching attachments (4) enabling it to be reversibly connected to the agricultural machine, and a rear part (5), which is opposite the aforementioned front part (3).

Preferably, the coupling parts (4) may include a tool bar (41), to which the chassis (2) is connected with two pairs of articulated, substantially parallel arms (42, 43), forming a double foldable, substantially horizontally arranged parallelogram, which allows for vertically adjusting the sowing unit (1) along the Y'-Y-axis.

The sowing unit (1) incorporates elements (6) for creating a furrow in the soil, preferably at a controlled depth, which includes opening discs, which are preferably also equipped with one or more gauge wheels for setting the depth of the furrow according to their position, and possibly also with a means of shaping the bottom of the furrow.

The sowing unit (1) can be equipped with means (7) for compacting the granular material at the bottom of the open furrow. Preferably, these means (7) include and/or incorporate at least one press wheel.

The sowing unit (1) also includes a mechanism (8) for filling the furrow, which is or include one or more closing discs or wheels, extending behind the mechanism (6) for opening the furrow, and behind the compacting element (7), if present. Ideally, these elements (8) may be located behind the sowing unit (1).

In addition, the sowing unit (1) can also be equipped with a debris removal mechanism (9) for removing crop residues, lumps of earth or stones, which includes at least one rotating wheel arranged in front of the sowing unit (1).

The sowing unit (1) features a first distribution assembly for the first granular product, which is preferably a seed or grain.

This first assembly includes a hopper (10), referred to as the "main" hopper, which is capable of storing, and, during operation, handling the seeds to be sown, and which is preferably located in the upper part of the chassis (2), above, level with or behind the furrow opening mechanism (6) and in front of the furrow filling mechanism (8). It may be attached to frame (2) in such a way that it can be easily replaced for maintenance purposes or when using the sowing unit (1), e.g. by another main seed hopper (10) identical to the one to be replaced, the other main seed hopper (10) preferably being pre-filled.

Figure 5:
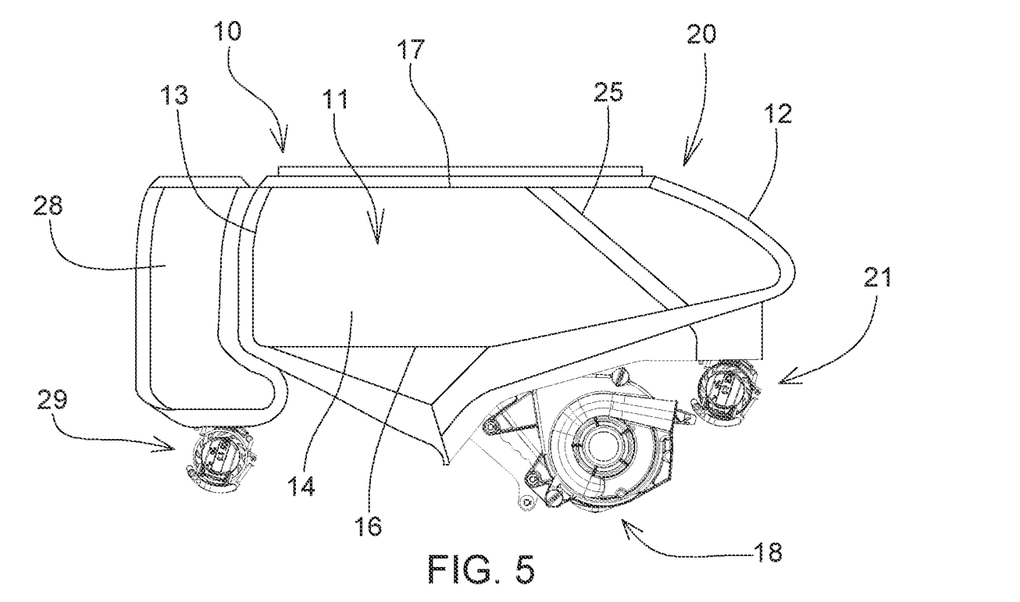
FIG. 5 is a diagram of a side view of the upper part of the sowing unit.
Figure 6:
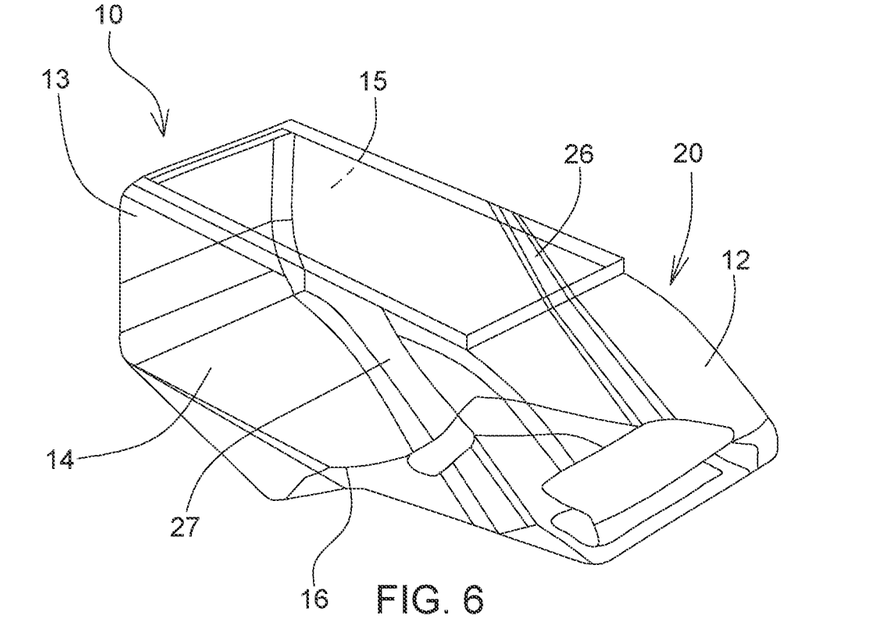
FIG. 6 is a diagram showing a close-up view of the sowing unit's main seed hopper.

The main hopper (10) may take on any suitable or possible size and shape, which determines its internal volume (11). It may be rectangular in shape and comprise a front panel (12), a rear panel (13) opposite the front panel (12), a first side panel (14), a second side panel (15) opposite the first side panel (14), a bottom panel (16) and a top panel (17) opposite the bottom panel (16) (FIGS. 5 and 6). The top panel (17) may have an opening, or partial opening, in order to enable at least the first granular product to be loaded, and then closed using a moving cover that can be closed when in operation.

The first distribution assembly also includes the first distribution unit (18) for distributing the first granular product, the seed to be sown, which is in communication with the main hopper (10), by means of an opening, preferably one that can be closed, in the bottom panel (16) of the main hopper (10).

This first distribution system (18) is a separate system, and is not part of the system for opening the furrow (6). This system (18) is not pressurized, but it can include or work in conjunction with a pneumatic system, the seeds being loaded individually, via suction or a vacuum, onto a cellular distribution disc, arranged vertically, and which rotates and releases the seeds one by one, by blowing or stopping the vacuum. For these purposes, the first distribution assembly may include or work in conjunction with a suction and/or blowing mechanism.

The first distribution mechanism (18) may preferably be positioned under the main hopper (10), with a mechanism located above and behind it (6) for opening the furrow, e.g. for depositing the seeds under gravity.

This first distribution mechanism (18) may be able to deposit the first granular products into the soil in the relative distribution position (P1) just behind the furrow opening mechanism (6) in relation to the direction of travel (D) of the sowing unit (1) during normal operation, e.g. between the two opening discs, the position (P1) being in front of the compacting mechanism (7), if present, and always in front of the furrow filling mechanism (8), in order to deposit the first granular products in the open furrow.

The first distribution mechanism (18) may preferably cooperate with a first conveyor mechanism (19) which directs the seeds as they fall and prevents them from falling out of the furrow, and the first conveyor mechanism (19) may also cooperate advantageously with a means of transferring the seeds from the first distribution mechanism's distribution disc to the first conveyor mechanism (19) for transferring the seeds into the soil.

The sowing unit (1) also includes at least one additional distribution assembly for at least one additional granular product, preferably a second and/or third distribution assembly for a second and/or third granular product, for depositing the additional granular product(s) at relative distribution positions (P1, P2, P3, and possibly P4), which are defined according to the direction of movement (D) of the sowing unit (1) during normal operation, and with regard to their location in relation to the furrow opening mechanism (6) and the furrow filling mechanism (8). This ensures greater variability in the positioning of the additional granular product(s), both vertically and horizontally, in the furrow and in the soil.

The additional granular product can also be a seed or grain, but of a different nature than that of the first granular product, providing a method of planting a number of crops at the same time. However, it is preferable that the second granular product is not a seed or grain, but a granular agrochemical product, or mixture of granular products, such as fertilizers, herbicides, insecticides, nematicides, fungicides, slug pellets, or other equivalent products.

The second distribution assembly includes a first hopper (20), known as an additional hopper, capable of containing and, during operation, handling one or several granular agrochemical products or granular fertilizers, the first additional hopper (20) preferably being located in the upper part of the chassis (2), above, level with or behind the furrow opening mechanism (6), in front of the furrow closing mechanism (7), and ideally located in front of and attached to the main hopper (10), in such a way that the two hoppers (10) and (20) share a common panel.

The second distribution unit includes a second distribution mechanism (21) to distribute a second granular product into the soil, which is in communication with the first hopper (20), e.g. through an opening, preferably one that can be closed off, in the bottom panel of the first hopper (20).

This second distribution system (21) is a separate system, and is not part of the furrow opening system (6), nor of the first distribution system (18) for the first granular product.

This second distribution mechanism (21) may be capable of depositing the second granular product at two different relative distribution positions (P1 and/or P2), which are relative to the furrow opening mechanism (6) and are also relative to the direction of movement (D) of the sowing unit (1) during normal operation.

The second dispensing mechanism (21) may be capable of depositing the second granular product in the relative dispensing position (P1), or in the immediate vicinity thereof, as defined for the first dispensing mechanism (18), i.e. behind the furrow opening mechanism (6) and in front of the compacting mechanism (7), if present, and always in front of the furrow filling mechanism (8), e.g. between the two opening discs, for depositing the second granular product in the open furrow. Thus, the second granular product is deposited in the furrow, at approximately the same depth as the first granular product, in front of or behind, close to or in close proximity to the first granular product.

This second dispensing mechanism (21) is also capable of depositing the second granular product in a relative dispensing position (P2). It is located before the furrow opening mechanism (6), preferably behind the debris clearing mechanism (8), if present, and is therefore positioned outside the furrow. This ensures that the second granular product is mixed with the top layer of soil when the furrow is opened. Once the sowing unit (1) has passed over the soil, the second granular product can then be found at different depths, close to the soil surface and/or in the bottom of the furrow, but also at different horizontal distances from the first granular product, near or in close proximity to the first granular product. This allows a wider vertical, but also horizontal, distribution of the second granular product in comparison to the first granular product, e.g. seed.

Preferably, the second granular product is deposited in the furrow, at the relative distribution position (P1), between each seed, or in the immediate vicinity of each seed, or out of the furrow, on the soil yet to be worked, at the relative distribution position (P2). The advantage of this is that the second granular product is deposited at both the relative dispensing position P1 and the relative dispensing position P2.

The second distribution mechanism (21) may ideally work in conjunction with or include a second conveyor mechanism (22), and may also include a transfer mechanism (23) for transferring the second granular product from the second distribution mechanism (21) to the second conveyor mechanism (22).

The second conveyor mechanism (22) may preferably include a number of distribution channels (221, 222), each channel (221, 222) corresponding to a relative distribution position, P1 or P2. These channels (221, 222) are to be joined at a distribution node (24), which is connected to and works in conjunction with the second conveyor mechanism (21) for the second granular product.

In another design, the distribution node (24) for distribution ducts (221, 222) extends into a single upper duct (223), which is connected and operates in conjunction with the second distribution mechanism (21).

The second distribution assembly may preferably include a mechanism for selecting the distribution positions at which the second granular product is to be deposited. This selection mechanism can be a means of manual and/or automatic selection of one or two distribution channels (221, 222). This selection mechanism may be preferably controlled by a control device.

Regardless of the design for the distribution channels (221, 222, 223), the selection mechanism may be, or include, a first valve, preferably a two-, three-, or four-way valve, located at the distribution node (24) for the distribution channels containing the second granular product.

Regardless of the design of the sowing unit (1), the first additional hopper (20) can be part of or integrated into the main hopper (10), which means that it takes up very little space and is highly adaptable. If a second granular product does not need to be deposited into the soil, the main hopper (10) can be used only for seeds, giving them a larger storage volume.

The first additional hopper (20) can take the form of an independent box, integrated in, or within, the main hopper (10), preferably attached to the main hopper (10) in such a way that it can be easily replaced by another box, when empty, which can be pre-filled with the second granular product, the second box having the same volume as the box to be replaced, or a different volume, which can be selected according to the needs and the amount of second granular product required. For an independent box integrated into the main hopper, its volume would be smaller than that of the main hopper (10), preferably adequate to fit through the opening in the top panel (17) of the main hopper (10).

The first additional hopper (20) may take the form of a separate compartment within the main hopper (10) (FIGS. 5 and 6), the two hoppers (10 and 20) sharing one or more common partitions (12, 13, 14, 15, 16, 17) and being separated by at least one removable and movable partition (25), preferably sliding, using or on one or two rails (26, 27), or several rails (26, 27), on the inner surface of one or two panels (14, 15) of the main hopper (10) (FIGS. 5 and 6), which has the advantage of great versatility, in particular allowing the respective volume of the two hoppers (10 and 20) to be varied according to the amount of first granular product and/or second granular product required. Preferably, the partition panel (25) may be positioned at an angle to the bottom panel (16) or top panel (17) of the main hopper (10) (FIG. 5). This has the advantage of facilitating the flow of the granular product using gravity, as well as increasing the width of the opening for loading the granular product at the top.

The main hopper (10) and the additional hopper (20) may ideally share a common bottom panel (16) comprising two separate openings, each communicating with the first and second distribution mechanisms respectively, which can be closed independently of each other.

In addition, the sowing unit (1) may preferably include a third granular product, which is not a seed or grain, but a granular agrochemical or fertilizer product, or a mixture of such products, including, by way of example, fertilizers, herbicides, insecticides, nematicides, fungicides, slug pellets, or other equivalent products.

The third distribution assembly comprises a second additional hopper (28) capable of containing and, in operation, of holding one or several agrochemical products or granular fertilizers, which is/are preferably different from that/those of the first additional hopper (20). The second hopper (28) may ideally be located in the upper part of the chassis (2), above, level with or behind the furrow closing mechanism (7), and may be positioned behind the main hopper (10), and attached to the main hopper (10) in such a way that the two hoppers (10) and (28) can share a common panel.

The third distribution assembly includes third distribution mechanism (29) for distributing a third granular product into the soil, which is in communication with the second hopper (28), e.g. through an opening, preferably one that can be closed, in the lower panel of the second hopper (28).

This third distribution system (29) is a separate system, and is not part of the furrow opening system (6), nor of the first distribution system (18) for the first granular product, nor of the second distribution system (21) for the second granular product.

This third distribution mechanism (29) may be capable of depositing the third granular product in at least two, preferably three different distribution positions (P1, P3, and/or P4). These positions may be relative to the furrow opening mechanism (6) and to the furrow filling mechanism (8) and may also be defined in relation to the direction of movement (D) of the sowing unit (1) during normal operation This third distribution mechanism (29) is capable of depositing the third granular product in the relative distribution position ("P1"), or in the immediate vicinity of this position, as defined for the first distribution mechanism (18), i.e. behind the furrow opening mechanism (6) and in front of the compacting mechanism (7), if present, and always in front of the furrow filling mechanism (8), e.g. between the two opening discs, for depositing the third granular product in the furrow, either in front of or behind, in the vicinity or immediate vicinity of the first and/or the second granular product. Thus, the third granular product is found in the furrow, at the same depth as the first granular product and possibly the second granular product, in front of or behind, or close to it/them.

This third distribution mechanism (29) will also be capable of depositing the third granular product at a relative distribution position (P3), after the furrow filling mechanism (8), i.e. outside the furrow, on the soil of the filled furrow.

In the design in which the sowing unit (1) comprises compacting means (7) for the granular products deposited at the bottom of the open furrow, the third distribution assembly is preferably also suitable for depositing the additional granular product at an additional relative distribution position (P4), which is located after the compacting means (7) and before the furrow closing mechanism (8). Therefore, the third granular product can be found at different depths in the furrow, at approximately the same depth as the first and/or second granular product, in front of or behind, close to or in the immediate vicinity of the first and/or second granular product, and/or at a lesser depth in the furrow, and/or on the soil surface on the covered furrow, thus outside the furrow. This allows for a wider vertical, but also horizontal distribution, not only of the third granular product in relation to the first granular product, but also in relation to the second granular products if the first and second granular products are used in combination with the third granular products.

In one specific design, the third granular product is deposited on the ground by means of a third conveyor mechanism (30), which ideally works in conjunction with the third transfer mechanism for transferring the third granular product from the third distribution mechanism (29).

The conveyor system (30) includes a number of distribution channels (301, 302, 303). Each channel (301, 302, 303) corresponds to a distribution position. The channels (301, 302, 303) meet at a distribution node (31), which is connected to and works in conjunction with the third distribution system (29). In another design, the distribution node (31) of distribution channels 301, 302, 303 is extended into a single upper channel, which is connected to and acts in conjunction with the third distribution mechanism (29).

Preferably, the third dispensing assembly includes means for selecting the dispensing positions at which the third granular product is to be deposited. These selection means can be means of manual and/or automatic selection of one or more of the distribution channels (301, 302, 303). These selection means are preferably controlled by a control device, and can be identical to, or be the same as, the control device controlling the selection means of the second distribution assembly.

Regardless of the design of the distribution channels (301, 302, 303), the selection means are, or include, a second valve, either two- or three-way, located at the distribution node (31) of the distribution channels (301, 302, 303) for the second granular product.

The seeder includes one or several sowing units (1), preferably mounted on a supporting frame, and carried or towed by an agricultural machine. The load-bearing chassis then includes a means of attachment to connect it to/disconnect it from the agricultural machine that carries or tows it. The seed drill may preferably have one or several wheels, ideally adjustable so that they can be lifted or retracted to avoid contact with the ground during maneuvering or when transporting the seed drill, for example.

The foregoing description and examples has been set forth merely to illustrate the disclosure and are not intended as being limiting. Each of the disclosed aspects and embodiments of the present disclosure may be considered individually or in combination with other aspects, embodiments, and variations of the disclosure. In addition, unless otherwise specified, none of the steps of the methods of the present disclosure are confined to any particular order of performance. Modifications of the disclosed embodiments incorporating the spirit and substance of the disclosure may occur to persons skilled in the art and such modifications are within the scope of the present disclosure. Furthermore, all references cited herein are incorporated by reference in their entirety.

Terms of orientation used herein, such as "top," "bottom," "horizontal," "vertical," "longitudinal," "lateral," and "end" are used in the context of the illustrated embodiment. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular" or "cylindrical" or "semi-circular" or "semi-cylindrical" or any related or similar terms, are not required to conform strictly to the mathematical definitions of circles or cylinders or other structures, but can encompass structures that are reasonably close approximations.

Conditional language used herein, such as, among others, "can," "might," "may," "e.g.," and the like, unless specifically stated otherwise, or otherwise understood within the context as used, is generally intended to convey that some embodiments include, while other embodiments do not include, certain features, elements, and/or states. Thus, such conditional language is not generally intended to imply that features, elements, blocks, and/or states are in any way required for one or more embodiments or that one or more embodiments necessarily include logic for deciding, with or without author input or prompting, whether these features, elements and/or states are included or are to be performed in any particular embodiment.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally parallel" can refer to something that departs from exactly parallel by less than or equal to 20 degrees.

Unless otherwise explicitly stated, articles such as "a" or "an" should generally be interpreted to include one or more described items. Accordingly, phrases such as "a device configured to" are intended to include one or more recited devices. Such one or more recited devices can be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

Although systems and methods for sowing and seeding units have been disclosed in the context of certain embodiments and examples, this disclosure extends beyond the specifically disclosed embodiments to other alternative embodiments and/or uses of the embodiments and certain modifications and equivalents thereof. Various features and aspects of the disclosed embodiments can be combined with or substituted for one another in order to form varying modes of systems and methods for sowing and seeding units. The scope of this disclosure should not be limited by the particular disclosed embodiments described herein.

Certain features that are described in this disclosure in the context of separate implementations can be implemented in combination in a single implementation. Conversely, various features that are described in the context of a single implementation can be implemented in multiple implementations separately or in any suitable subcombination. Although features may be described herein as acting in certain combinations, one or more features from a claimed combination can, in some cases, be excised from the combination, and the combination may be claimed as any subcombination or variation of any subcombination.

While the methods and devices described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various embodiments described and the appended claims. Further, the disclosure herein of any particular feature, aspect, method, property, characteristic, quality, attribute, element, or the like in connection with an embodiment can be used in all other embodiments set forth herein. Any methods disclosed herein need not be performed in the order recited. Depending on the embodiment, one or more acts, events, or functions of any of the algorithms, methods, or processes described herein can be performed in a different sequence, can be added, merged, or left out altogether (e.g., not all described acts or events are necessary for the practice of the algorithm). In some embodiments, acts or events can be performed concurrently, e.g., through multi-threaded processing, interrupt processing, or multiple processors or processor cores or on other parallel architectures, rather than sequentially. Further, no element, feature, block, or step, or group of elements, features, blocks, or steps, are necessary or indispensable to each embodiment. Additionally, all possible combinations, subcombinations, and rearrangements of systems, methods, features, elements, modules, blocks, and so forth are within the scope of this disclosure. The use of sequential, or time-ordered language, such as "then," "next," "after," "subsequently," and the like, unless specifically stated otherwise, or otherwise understood within the context as used, is generally intended to facilitate the flow of the text and is not intended to limit the sequence of operations performed. Thus, some embodiments may be performed using the sequence of operations described herein, while other embodiments may be performed following a different sequence of operations.

Moreover, while operations may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described herein should not be understood as requiring such separation in all implementations, and it should be understood that the described components and systems can generally be integrated together in a single product or packaged into multiple products. Additionally, other implementations are within the scope of this disclosure.

Some embodiments have been described in connection with the accompanying figures. Certain figures are drawn and/or shown to scale, but such scale should not be limiting, since dimensions and proportions other than what are shown are contemplated and are within the scope of the embodiments disclosed herein. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

The methods disclosed herein may include certain actions taken by a practitioner; however, the methods can also include any third-party instruction of those actions, either expressly or by implication. For example, actions such as "positioning an electrode" include "instructing positioning of an electrode."

The ranges disclosed herein also encompass any and all overlap, subranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 1 V" includes "1 V." Phrases preceded by a term such as "substantially" include the recited phrase and should be interpreted based on the circumstances (e.g., as much as reasonably possible under the circumstances). For example, "substantially perpendicular" includes "perpendicular." Unless stated otherwise, all measurements are at standard conditions including temperature and pressure.

In summary, various embodiments and examples of systems and methods for sowing and seeding units have been disclosed. Although the systems and methods for sowing and seeding units have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Thus, the scope of this disclosure should not be limited by the particular disclosed embodiments described herein, but should be determined only by a fair reading of the claims that follow.

What is claimed is:

1. A sowing unit for granular products to be distributed on the ground, including:
    a mechanism for opening a furrow in the ground,
    a mechanism for refilling in the furrow,
    a first assembly for dispensing a first granular product, including a main hopper, a first distribution mechanism for dispensing a first granular product, in communication with the aforementioned main hopper, a first means of conveying the first granular product to the ground, to a first relative distribution position situated between the mechanism for opening the furrow and the mechanism for refilling the furrow,
    at least one additional dispensing assembly for at least one additional granular product including a dispensing mechanism capable of depositing at least one additional granular product at said relative dispensing position, and at another relative dispensing position situated before said mechanism for opening the furrow, or at another relative dispensing position situated after said mechanism for refilling the furrow, wherein the additional distribution assembly may cooperate with or include a selection mechanism for depositing the said at least one additional granular product at either of the said relative distribution positions and both at the said relative distribution positions, wherein the first distribution assembly is suitable for distributing seeds and the additional distribution assembly is suitable for distributing granular agrochemicals or granular fertilizers.

2. The sowing unit according to claim 1, further comprising means for compacting the granular products deposited at the bottom of the open furrow, which is located behind the means for opening the furrow and in front of the means for refilling the furrow, and in which the relative distribution position is located behind said means for opening the furrow and in front of said compacting means; the additional distribution assembly being able to deposit the additional granular product in an additional relative distribution position located after said compacting means and before said means for filling the furrow.

3. A sowing unit according to claim 1, in which the additional distribution assembly comprises at least one of a second distribution assembly for distributing a second granular product and a third distribution assembly for dispensing a third granular product,
    the second distribution assembly for distributing a second granular product comprising a first additional hopper, a second distribution mechanism for distributing said second granular product onto the soil, in communication with said first additional hopper, with this second distribution assembly being capable of depositing said second granular product in the relative distribution positions, and
    the third distribution assembly for dispensing a third granular product including a second additional hopper and third dispensing mechanism for dispensing a third granular product onto the soil, which are in communication with said second additional hopper, and with said third dispensing assembly being capable of depositing said third granular product in relative dispensing positions.

4. A sowing unit according to claim 3, in which the second distribution assembly and the third distribution assembly cooperate with or respectively include conveyor mechanisms made up of a number of distribution channels, each corresponding to a relative distribution position and which meet at a distribution node.

5. A sowing unit according to claim 4, with the conveyor mechanism being equipped with a multi-way selector valve located at the distribution node.

6. A sowing unit according to claim 3, in which the first additional hopper is integrated into or incorporated within the main hopper.

7. A sowing unit according to claim 6, in which the first additional hopper is an independent box that can be fitted to and removed from the main hopper.

8. A sowing unit according to claims 3, in which the first additional hopper is a separate compartment in the main hopper, with said hoppers sharing one or more common partitions and being separated by at least one removable and displaceable dividing panel.

9. The sowing unit according to claim 8, in which the removable dividing panel can be moved along one or several rails provided on the inner surface of one or two panels of the main hopper.

10. The sowing unit according to claim 3, in which the first distributing mechanism and the second distributing mechanism are arranged in line with the mechanism for opening the furrow.

11. A sowing unit for delivering granular commodities to the soil, the sowing unit comprising:
at least one opener disk configured to open a furrow in the soil;
at least one closing wheel configured to close the furrow opened by the at least one opener disk,
a first dispensing assembly configured to dispense a first granular commodity, the first dispensing assembly comprising:
a first granular commodity hopper configured to hold a quantity of the first granular commodity;
a first granular commodity meter in communication with the first granular commodity hopper, wherein the first granular commodity meter is configured to receive the first granular commodity from the first granular commodity hopper and dispense the first granular commodity received from the first granular commodity hopper;
a first granular commodity conveying system configured to receive the first granular commodity dispensed by the first granular commodity meter and guide the first granular commodity to a first position within the furrow in the soil, wherein the first position is located between the at least one opener disk and the at least one closing wheel in a direction of travel of the sowing unit during use;
a second dispensing assembly configured to dispense a second granular commodity, the second dispensing assembly comprising:
a second granular commodity meter configured to receive the second granular commodity and dispense the second granular commodity;
a second granular commodity conveying system configured to receive the second granular commodity dispensed by the second granular commodity meter and guide the second granular commodity to at least one of: (i) the first position within the furrow in the soil, (ii) a second position within the furrow in the soil, and (iii) a third position within the furrow in the soil, wherein the second position is located before the at least one opener disk in the direction of travel of the sowing unit during use and the third position is located after the at least one closing wheel in the direction of travel of the sowing unit during use;
a granular commodity diverter configured to divert the second granular commodity dispensed by the second granular commodity meter in one of an individual mode and a simultaneous mode, wherein when in the individual mode the granular commodity diverter is configured to divert the second granular commodity to any single one of the first position within the furrow in the soil, the second position within the furrow in the soil, and the third position within the furrow in the soil, and wherein when in the simultaneous mode, the granular commodity diverter is configured to divert the second granular commodity to at least two of the first position within the furrow in the soil, the second position within the furrow in the soil, and the third position within the furrow in the soil.

12. The sowing unit for delivering granular commodities to the soil of claim 11 further comprising a press element configured to compact the granular products into the furrow in the soil, wherein the press element is located between the first position and the at least one closing wheel in the direction of travel of the sowing unit during use.

13. The sowing unit for delivering granular commodities to the soil of claim 12, wherein the second dispensing assembly is configured to guide the second granular commodity to least a fourth position within the furrow in the soil, wherein the fourth position is located after the press element and before the at least one closing wheel in the direction of travel of the sowing unit during use.

14. The sowing unit for delivering granular commodities to the soil of claim 13, wherein the press element comprises a press wheel.

15. The sowing unit for delivering granular commodities to the soil of claim 11 further comprising a third dispensing assembly configured to dispense a third granular commodity.

16. The sowing unit for delivering granular commodities to the soil of claim 15, wherein the second dispensing assembly further comprises a second granular commodity hopper configured to hold a quantity of the second granular commodity and in communication with the second granular commodity meter.

17. The sowing unit for delivering granular commodities to the soil of claim 16, wherein the second granular commodity hopper is at least one of integrated and integratable with the first granular commodity hopper.

18. The sowing unit for delivering granular commodities to the soil of claim 17, wherein the second granular commodity hopper comprises a compartment configured to be removably fitted to the first granular commodity hopper.

19. The sowing unit for delivering granular commodities to the soil of claim 16, wherein the second granular commodity hopper comprises a compartment within the first granular commodity hopper, wherein the second granular commodity hopper and the first granular commodity hopper share at least one wall in common and are separated by at least one dividing wall.

20. The sowing unit for delivering granular commodities to the soil of claim 19, wherein the at least one dividing wall is at least one of: (i) movable between a plurality of dividing wall positions, and (ii) removable from each dividing wall position of the plurality of dividing wall positions.

21. The sowing unit for delivering granular commodities to the soil of claim 19, wherein the at least one dividing wall is configured to be held by at least one of at least one rail and at least one groove on an inner surface of the first granular commodity hopper.

22. The sowing unit for delivering granular commodities to the soil of claim 15, wherein the third dispensing assembly comprises:
- a third granular commodity hopper configured to hold a quantity of the third granular commodity; and
- a third granular commodity meter configured to receive the third granular commodity and dispense the third granular commodity.

23. The sowing unit for delivering granular commodities to the soil of claim 22, wherein the third dispensing assembly further comprises:
- a third granular commodity conveying system configured to receive the third granular commodity dispensed by the third granular commodity meter and guide the third granular commodity to at least one of: (i) the first position within the furrow in the soil, (ii) the second position within the furrow in the soil, and (iii) the third position within the furrow in the soil.

24. The sowing unit for delivering granular commodities to the soil of claim 23, wherein at least one of the second granular commodity conveying system and the third granular commodity conveying system further comprises a plurality of distribution channels, each distribution channel of the plurality of distribution channels having a first end and a second end, wherein the first end of each distribution channel of the plurality of distribution channels is in communication with a distribution node; and wherein the second end of each distribution channel of the plurality of distribution channels is associated with a single one of: (i) the first position within the furrow in the soil, (ii) the second position within the furrow in the soil, and (iii) the third position within the furrow in the soil.

25. The sowing unit for delivering granular commodities to the soil of claim 24, wherein the second granular commodity conveying system comprises a first plurality of distribution channels, wherein the first end of each distribution channel of the first plurality of distribution channels is in communication with a first distribution node; and wherein the second end of each distribution channel of the first plurality of distribution channels is associated with a single one of: (i) the first position within the furrow in the soil, (ii) the second position within the furrow in the soil, and (iii) the third position within the furrow in the soil, and wherein and the third granular commodity conveying system comprises a second plurality of distribution channels, wherein the first end of each distribution channel of the second plurality of distribution channels is in communication with a second distribution node; and wherein the second end of each distribution channel of the second plurality of distribution channels is associated with a single one of: (i) the first position within the furrow in the soil, (ii) the second position within the furrow in the soil, and (iii) the third position within the furrow in the soil.

26. The sowing unit for delivering granular commodities to the soil of claim 24 further comprising a multi-way selector valve located at the distribution node.

27. The sowing unit for delivering granular commodities to the soil of claim 11, wherein the first dispensing assembly and the second dispensing assembly are arranged in-line, in a direction of travel of the sowing unit during use, with the at least one opener disk configured to open a furrow in the soil.

28. The sowing unit for delivering granular commodities to the soil of claim 11, wherein the first granular commodity comprises a seed and the second and third granular commodities comprise at least one of an agrochemical and a fertilizer.

* * * * *